United States Patent
Kim et al.

(10) Patent No.: US 7,948,577 B2
(45) Date of Patent: May 24, 2011

(54) STEREOSCOPIC DISPLAY DEVICE

(75) Inventors: Yong-Hwi Kim, Gyeonggi-do (KR);
Bong-Hyun You, Yongin-si (KR);
Jae-Chang Choi, Yongin-si (KR);
Jin-Hee Park, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 224 days.

(21) Appl. No.: 12/257,106

(22) Filed: Oct. 23, 2008

(65) Prior Publication Data
US 2009/0174827 A1     Jul. 9, 2009

(30) Foreign Application Priority Data
Jan. 3, 2008   (KR) .................. 10-2008-0000868

(51) Int. Cl.
*G02F 1/1333*   (2006.01)
(52) U.S. Cl. ........................................... 349/58
(58) Field of Classification Search .................. None
See application file for complete search history.

(56) References Cited

U.S. PATENT DOCUMENTS

| | | | | |
|---|---|---|---|---|
| 7,612,833 B2* | 11/2009 | Kim | .................. | 349/15 |
| 7,787,071 B2* | 8/2010 | Nishio et al. | .................. | 349/58 |
| 2008/0094545 A1* | 4/2008 | Ko | .................. | 349/96 |
| 2008/0123025 A1* | 5/2008 | Li et al. | .................. | 349/74 |
| 2009/0147171 A1* | 6/2009 | Yang et al. | .................. | 349/58 |
| 2010/0134721 A1* | 6/2010 | Kamada | .................. | 349/65 |

* cited by examiner

*Primary Examiner* — Sung H Pak
(74) *Attorney, Agent, or Firm* — Innovation Counsel LLP

(57) ABSTRACT

Disclosed is a stereoscopic display device including: a first display panel displaying a main image; a second display panel disposed on the first display panel and displaying a sub-image; a first mold frame supporting the first display panel and maintaining a gap between the first display panel and the second display panel; and a second mold frame supporting the second display panel. The first mold frame may include sidewalls forming an enclosed space with the first and second display panels and having a portion that inclines into the enclosed space.

15 Claims, 3 Drawing Sheets

STEREOSCOPIC DISPLAY DEVICE

CROSS-REFERENCE TO RELATED APPLICATION

This application claims priority to and the benefit of Korean Patent Application No. 10-2008-0000868 filed in the Korean Intellectual Property Office on Jan. 3, 2008, the disclosure of which is incorporated herein by reference in its entirety.

BACKGROUND OF THE INVENTION

1. Field of the Invention

The present invention relates to a liquid crystal display (LCD) device and, more particularly, to a stereoscopic display device which displays a stereoscopic image using a pair of LCD panels.

2. Description of the Related Art

At present, it is expected that services over an ultra-high-speed information communication network will be developed from voice communications over a telephone to multimedia services that provide voice and data communications through digital terminals. These ultra-high-speed communications can process character, voice and image data at high speed and will ultimately evolve into three-dimensional information communication services that allow users to see, feel and enjoy objects three-dimensionally.

Generally, a three dimensional image is obtained by the principle of stereoscopic visual angle using images as seen through two eyes of a person. Binocular parallax, which appears by two eyes spaced apart by about 65 mm, is considered to be an important factor in the stereoscopic effect. That is, the left and right eyes see different two-dimensional images. The two different images are transmitted to the brain through the retina. Then, the brain fuses those two different images with great accuracy to reproduce the perspective and reality of the three dimensional image.

A dual liquid crystal display (LCD) using a pair of LCD panels, one of the methods of displaying stereoscopic images, is used as a new LCD device capable of displaying a stereoscopic image. However, the dual LCD using the pair of LCD panels has a drawback in that a dark portion may occur along the edges/sides. The dark portion occurs when a mold that maintains a gap provided between the two panels is viewed, and it makes the display region small. Due to the dark portion, the image on the periphery of the screen is not viewed and becomes dark. Moreover, in case where a mold with a color having a low brightness is used, the possibility that the dark portion is viewed is increased. Accordingly, the display quality is generally deteriorated.

SUMMARY OF THE INVENTION

Accordingly, the present invention provides a stereoscopic display device, in which a first mold frame maintaining a gap between first and second display panels includes sidewalls each having a portion that inclines inward to effectively remove a dark portion from the viewed image. Moreover, the present invention provides a stereoscopic display device which can increase the brightness through a change in the structure of the first mold frame.

In accordance with an aspect of the present invention, there is provided a stereoscopic display device including: a first display panel displaying a main image; a second display panel disposed on the first display panel and displaying a sub-image; a first mold frame supporting the first display panel and maintaining a gap between the first display panel and the second display panel; and a second mold frame supporting the second display panel, wherein the first mold frame includes sidewalls that form an enclosed space with the first and second display panels and having a portion that inclines into the enclosed space.

The sidewalls may incline such that the distance between the sidewalls decreases going from the second display panel to the first display panel.

The sidewalls may make an acute angle with the second display panel, the acute angle being in the range of about 45° to about 89°.

The second display panel disposed on a rear of the first display panel spaced at a predetermined interval.

Each of the sidewalls may include a first end adjacent to the first display panel and a second end adjacent to the second display panel, in which the thickness of the first end and the second end may be greater than that of a region between the first end and the second end.

Each of the sidewalls may include a concave surface.

Each of the sidewalls may have a V-groove formed thereon and facing each other.

The sidewalls of the first mold frame may have a white color's intensity of more than 5 when assumed that a white color's intensity of black is 0 and a white color's intensity of full white is 10.

The sidewalls of the first mold frame have a white color's reflectance of more than about 10% when assumed that a white color's reflectance of black is 0% and a white color's intensity of full white is 100%.

The sidewalls may include a light reflective material, and the light reflective material may be at least of aluminum (Al) and silver (Ag).

The sidewalls may further include a reflection sheet including a light reflective material.

At least one of the first and second display panels may be a liquid crystal display panel.

The liquid crystal display panel may further include a backlight assembly supplying light.

The stereoscopic display device may further include a bottom chassis receiving the second mold frame and the backlight assembly, and a top chassis fixing the first and second display panels and surrounding the first and second mold frames.

BRIEF DESCRIPTION OF THE DRAWINGS

The above and other features of the present invention will be described in reference to certain exemplary embodiments thereof with reference to the attached drawings in which.

DETAILED DESCRIPTION OF THE INVENTION

Figure 1:
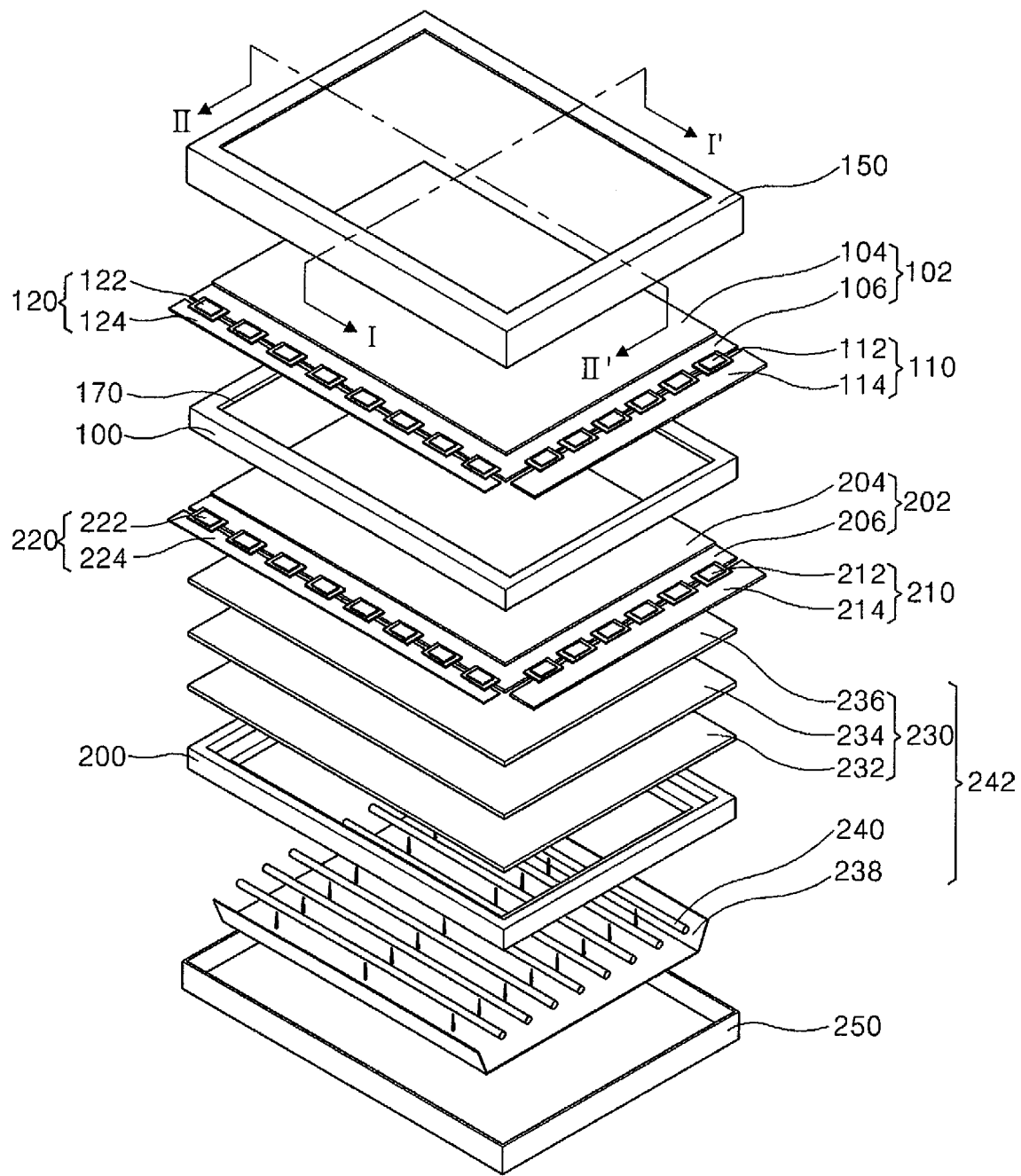
FIG. 1 is a perspective view showing a stereoscopic display device in accordance with an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a perspective view showing a stereoscopic display device in accordance with an exemplary embodiment of the present invention.

Referring to FIG. 1, the stereoscopic display device in accordance with the exemplary embodiment of the present invention includes first and second display panels 102 and 202, first and second panel drivers 110, 120, 210 and 220, first and second mold frames 100 and 200, a backlight assembly 242, a top chassis 150, and a bottom chassis 250. At least one of the first and second display panels 102 and 202 may be formed of a liquid crystal display (LCD) panel. Other panels such as a plasma display panel (PDP), or a panel using an organic light emitting diode (OLED) may be used. Although the description will be given in terms of an LCD panel, this is not a limitation of the invention and various other display panels may be used as the first and second display panels.

The first and second display panels 102 and 202 include thin film transistor (TFT) substrates 106 and 206 and color filter substrates 104 and 204 facing and bonded to each other with a liquid crystal layer between them. The liquid crystal layer is used for adjusting the amount of light transmission, as is well known.

Each of the first and second color filter substrates 104 and 204 includes a black matrix for preventing light leakage, a color filter for displaying color, a common electrode forming a vertical field with a pixel electrode, and a color filter array having an upper alignment layer formed on the common electrode for the liquid crystal alignment.

Each of the first and second TFT substrates 106 and 206 includes a gate line and a data line formed substantially perpendicularly to each other, a TFT provided at an intersection thereof, a pixel electrode electrically connected to the TFT, and a TFT array having a lower alignment layer formed thereon for the liquid crystal alignment.

The first display panel 102 displays a main image, and the second display panel 202 disposed on the rear surface of the first display panel 102 displays a sub-image of the stereoscopic display device. Accordingly, the first TFT substrate 106 of the first display panel 102 is connected to a first gate driver 110 and a first data driver 120, and the second TFT substrate 206 of the second display panel 202 is connected to a second gate driver 210 and a second data driver 220.

The first gate driver 110 includes a first gate printed circuit board (PCB) 114 and a first gate integrated circuit (IC) 112 mounted on a first gate tape carrier package (TCP) disposed between the first gate PCB 114 and the first TFT substrate 106.

The first gate IC 112 sequentially supplies a scan signal of a gate high voltage to a plurality of gate lines. Moreover, the first gate IC 112 supplies a gate low voltage to the gate lines while the gate high voltage is not supplied. The first gate PCB 114 supplies a control signal and a power signal from a timing control unit and a power unit mounted on a first data PCB 124 to the first gate IC 112.

The first data driver 120 includes the first data PCB 124 and a first data integrated circuit (IC) 122 mounted on a first data TCP disposed between the first data PCB 124 and the first TFT substrate 106.

The first data IC 122 converts pixel data into an analog pixel signal and supplies the same to a plurality of data lines. The first data PCB 124 supplies a control signal, a power signal and pixel data from the timing control unit and the power unit to the first data IC 122.

Since the second gate driver 210 and the second data driver 220 have the same driving mechanisms as those of the first gate driver 110 and the first data driver 120, their detailed description will be omitted. However, the first gate driver 110 and the first data driver 120 supply main images to the first display panel 102, and the second gate driver 210 and the second data driver 220 supply sub-images to the second display panel 202 so that the main images and the sub-images are harmonized with each other, thus enabling a viewer to view a stereoscopic image. In other words, when a character and a background are displayed on the first and second display panels 102 and 202 as the main images and the sub-images, respectively, the main images are superimposed on the sub-images. Thus, the viewer may see the superimposed images of the character and background.

The first mold frame 100 supports the first display panel 102 and maintains a gap between the first display panel 102 and the second display panel 202. Moreover, the first mold frame 100 includes sidewalls 170 forming a space together with the first and second display panels 102 and 202. Each of the sidewalls 170 includes a portion inclined toward the inner space. The inclination and shape of the sidewalls 170 will be described in more detail with reference to FIGS. 2A to 4 later. Moreover, the sidewalls 170 of the first mold frame 100 may have a white color's intensity of more than about 5 when assumed that a white color's intensity of black is 0 and a white color's intensity of full white is 10. In addition, the sidewalls 170 of the first mold frame 100 may have a white color's reflectance of more than about 10% when assumed that a white color's reflectance of black is 0% and a white color's intensity of full white is 100%.

If the sidewalls 170 of the first mold frame 100 have a brightness of less than 5, the sidewalls 170 of the first mold frame 100 have a dark color close to black, and thus the sidewalls 170 of the first mold frame 100 may be viewed according to the viewing angles and the possibility that a dark portion may occur is increased. Accordingly, the sidewalls 170 of the first mold frame 100 may have a brightness of more than 5.

Moreover, the first mold frame 100 may further include a light reflective material to improve the display brightness. The light reflective material is at least one of aluminum (Al) and silver (Ag). Further, a reflection sheet may be attached to the sidewalls 170 of the first mold frame 100 to add a reflection function, thus improving the display brightness.

The second mold frame 200 supports the second display panel 202. The backlight assembly 242 is disposed on the bottom of the second display panel 202.

The backlight assembly 242 includes a lamp 240, a reflection sheet 238, and optical sheets 230. The lamp 240 emits light using externally-supplied electric power and the light from the lamp 240 is transmitted to the first and second display panels 102 and 202. A plurality of such lamps 240 may be provided at the bottom of the display panel so as to function as a direct type backlight assembly 242. In the case where the direct type backlight assembly 242 is used, the light can be directly transmitted from the rear surface of the LCD device to the LCD panel, and thus it is not necessary to provide a light guide plate required in an edge type backlight assembly. Accordingly, the manufacturing process can be simplified. Moreover, in the case where any one of the first and second display panels 102 and 202 is a self-luminous display panel, a separate light source is not required.

The reflection sheet 238 is disposed on the bottom of the lamps 240 and serves to reflect the light emitted from the lamps 240 to the lower surface toward the LCD panel. Since the reflection sheet 238 includes a material that can reflect and diffuse the light, it can perform a function of reflecting and diffusing the light transmitted thereto.

The optical sheets 230 are sequentially stacked on top of the lamps 240 and include a diffusion sheet 232 for diffusing the light, a prism sheet 234 for converting the emitting angle of the light to be vertical to the LCD panel and collecting the light, and a protection sheet 236 for protecting the surface of the prism sheet 234. Although the description is for the optical sheet 230 having a structure in which the diffusion sheet 232, the prism sheet 234 and the protection sheet 236 are single sheets stacked on top of each other, this is not a limitation of the invention. For example, each of the respective sheets may be provided as a plurality of sheets in another embodiment.

The bottom chassis 250 receives the backlight assembly 242, surrounds the edge of the backlight assembly 242, and receives the second mold frame 200, which is disposed on the inner surface of the bottom chassis 250, and the second display panel 202, which is accommodated on the top of the second mold frame 200.

The top chassis 150 surrounds the edge of the first and second display panels 102 and 202 and is connected to the outer surface of the bottom chassis 250, connected to the first and second mold frames 200, to prevent the movement of the inner components of the stereoscopic display device. Moreover, the top chassis 150 protects the edges of the first and second display panels 102 and 202.

Figure 2A:
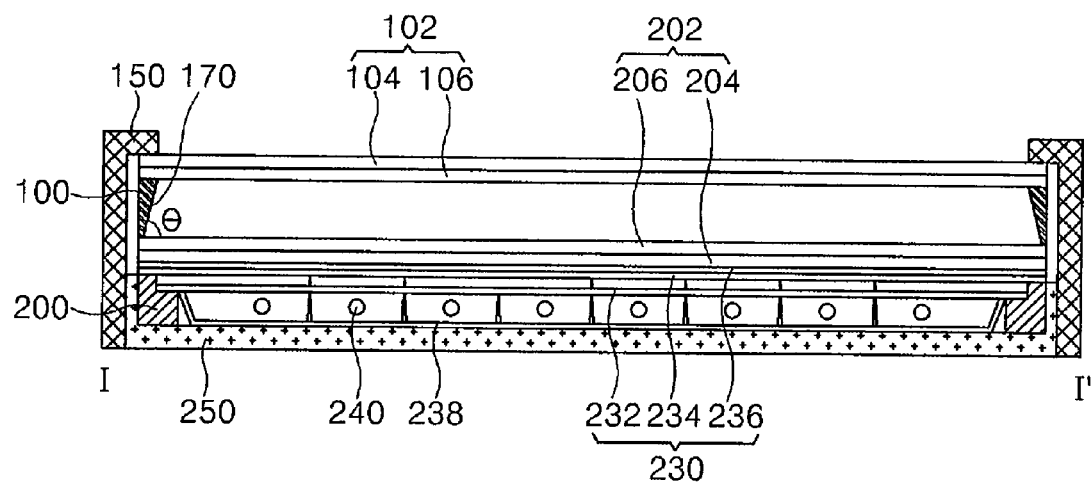
FIGS. 2A and 2B are cross-sectional views showing a first mold frame in accordance with a first embodiment of the present invention, taken along lines I-I' and II-II' of FIG. 1.
Figure 2B:
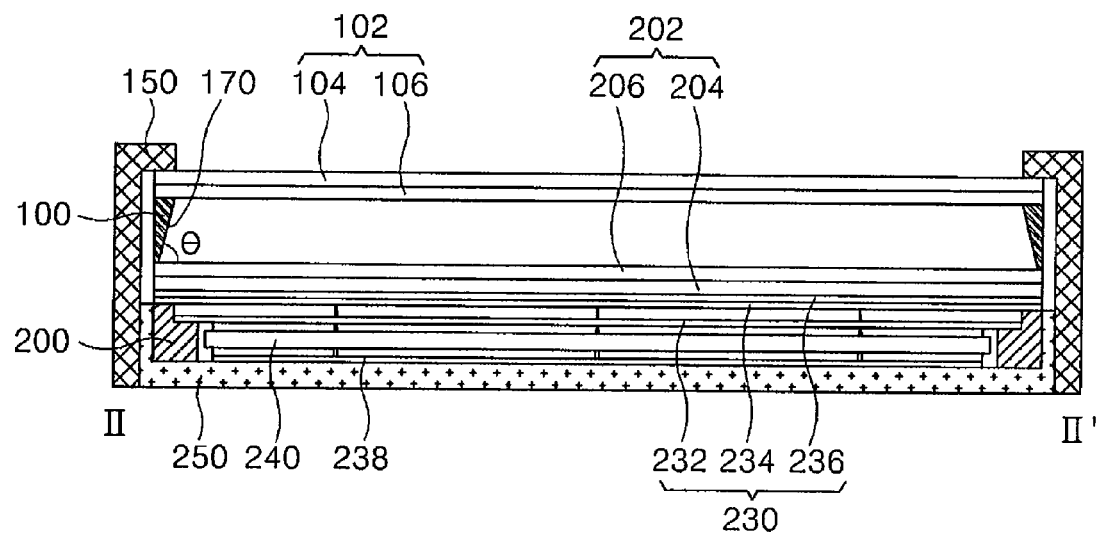

FIGS. 2A and 2B are cross-sectional views showing the first mold frame in accordance with a first embodiment of the present invention, taken along lines I-I' and II-II' of FIG. 1.

As shown in FIGS. 2A and 2B, the first mold frame 100 serves to maintain a gap between the first and second display panels 102 and 202. The first mold frame 100 includes sidewalls 170 which may be inclined in a direction such that the size of the opening in the mold frame 100 decreases with distance from the second display panel 202. In this case, an acute angle θ that the sidewalls 170 make with the second display panel 202 may be in the range of about 45° to about 89°.

If the acute angle θ that the sidewalls 170 of the first mold frame 100 make with the second display panel 202 is less than about 45°, the gap between the first and second display panels 102 and 202 is too small and the first mold frame 100 adjacent to the first display panel 102 extends to the display region, thus deteriorating the display quality of the stereoscopic display device. On the other hand, if the acute angle θ that the sidewalls 170 of the first mold frame 100 make with the second display panel 202 exceeds 89°, the sidewalls 170 that maintain the gap between the first and second display panels 102 and 202 is most likely to be viewed according to the viewing angles, thus deteriorating the display quality of the stereoscopic display device. Accordingly, the acute angle θ that the sidewalls 170 of the first mold frame 100 make with the second display panel 202 may be determined in the range of about 45° to about 89° according to the gap between the first and second display panels 102 and 202.

Since the gap between the first and second display panels 102 and 202 has an effect on the characteristics of the stereoscopic display device, the gap between the first and second display panels 102 and 202 should be adjusted in the range that can display a stereoscopic image without moire.

In addition, the sidewalls 170 may further include a metal material having a high reflectivity. By example only, the sidewalls 170 may include at least one of aluminum (Al) and silver (Ag). Moreover, a reflection sheet including a light reflective material may be attached to the sidewalls 170 of the first mold frame 100. With the reflection sheet, the light transmitted to the sidewalls 170 of the first mold frame 100 can be reflected toward the first display panel 102, thus increasing the brightness.

Figure 3:
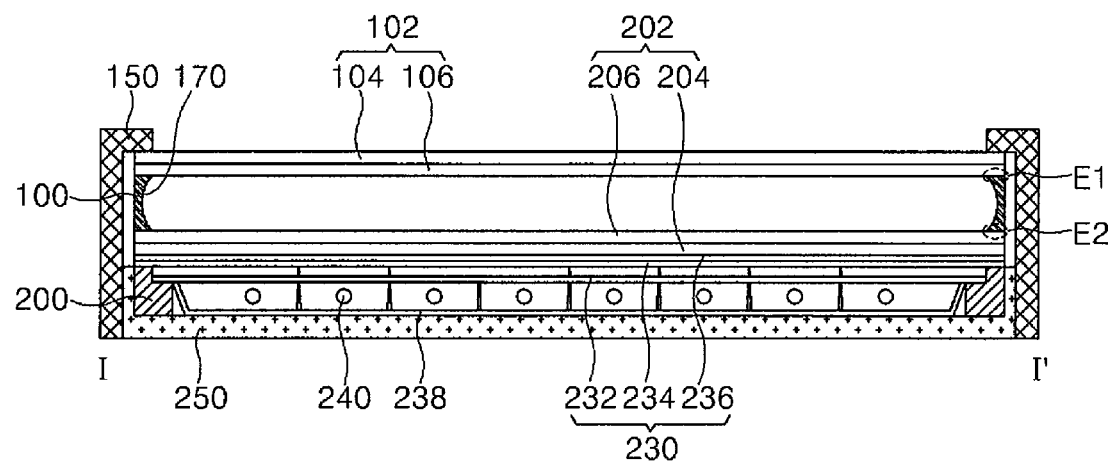
FIG. 3 is a cross-sectional view showing a first mold frame in accordance with a second embodiment of the present invention, taken along line I-I'.

FIG. 3 is a cross-sectional view showing a first mold frame in accordance with a second embodiment of the present invention, taken along line I-I'.

As shown in FIG. 3, the first mold frame 100 includes sidewalls 170 which serve to maintain the gap between the first and second display panels 102 and 202. Each of the sidewalls 107 of the first mold frame 100 includes a curved, concave surface, in which the thickness of a first end E1 adjacent to the first display panel 102 and a second end E2 adjacent to the second display panel 202 is greater than that of a region between the first end E1 and the second end E2. Moreover, as described above in the exemplary embodiment, the sidewalls 170 of the first mold frame 100 may include a light reflective material such as aluminum (Al) and silver (Ag) or a reflection sheet so as to reflect much more light, which may be transmitted to the lateral surface of the first mold frame 100 to be lost, toward the first display 102, thus increasing the brightness.

Figure 4:
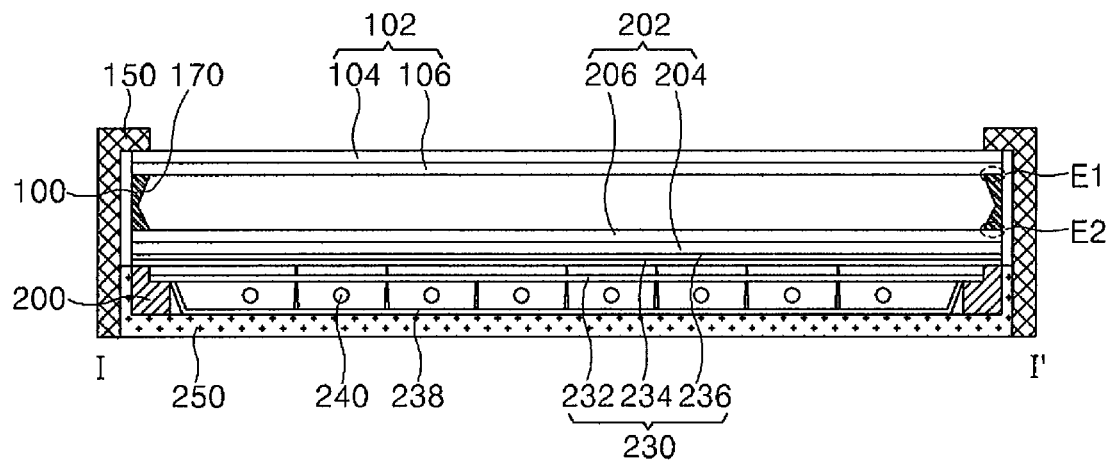
FIG. 4 is a cross-sectional view showing a first mold frame in accordance with a third embodiment of the present invention, taken along line I-I'.

FIG. 4 is a cross-sectional view showing a first mold frame in accordance with a third embodiment of the present invention, taken along line I-I'.

As shown in FIG. 4, the first mold frame 100 includes sidewalls 170 which serve to maintain the gap between the first and second display panels 102 and 202. Each of the sidewalls 107 has a V-groove on it, in which the thickness of a first end E1 adjacent to the first display panel 102 and a second end E2 adjacent to the second display panel 202 is greater than that of a region between the first end E1 and the second end E2. In this embodiment, the characteristics and effects of the sidewalls 170 are the same as those of the second embodiment, except that the sidewalls 170 are formed with an angle. Accordingly, with the increase in the brightness, the display characteristics of the stereoscopic display device are improved.

Although the stereoscopic display device using the LCD panels has been described in the above embodiments, the present invention is not limited to the LCD panels, but can easily be applied to an organic light emitting diode (OLED) display and a plasma display panel (PDP).

As described above, the stereoscopic display device in accordance with the present invention can effective remove the dark portion and increase the brightness by modifying the shape of the sidewalls of the mold frame and changing the color of the mold frame from black to white.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A stereoscopic display device comprising:
   a first display panel displaying a main image;
   a second display panel disposed on the first display panel and displaying a sub-image;
   a first mold frame supporting the first display panel and maintaining a gap between the first display panel and the second display panel; and
   a second mold frame supporting the second display panel, wherein the first mold frame includes sidewalls that form an enclosed space with the first and second display panels, the sidewalls having a portion that inclines into the enclosed space.

2. The stereoscopic display device of claim 1, wherein the sidewalls incline such that the distance between the sidewalls decreases going from the second display panel to the first display panel.

3. The stereoscopic display device of claim 2 wherein the sidewalls make an acute angle with the second display panel, the acute angle being in the range of about 45° to about 89°.

4. The stereoscopic display device of claim 1, wherein the second display panel disposed on a rear of the first display panel spaced at a predetermined interval.

5. The stereoscopic display device of claim 1, wherein each of the sidewalls comprises a first end adjacent to the first display panel and a second end adjacent to the second display panel, in which the thickness of the first end and the second end is greater than that of a region between the first end and the second end.

6. The stereoscopic display device of claim 5, wherein each of the sidewalls comprises a concave surface.

7. The stereoscopic display device of claim 5, wherein each of the sidewalls has a V-groove formed thereon and facing each other.

8. The stereoscopic display device of claim 1, wherein the sidewalls of the first mold frame have a white color's intensity of more than 5 when assumed that a white color's intensity of black is 0 and a white color's intensity of full white is 10.

9. The stereoscopic display device of claim 8, wherein the sidewalls of the first mold frame have a white color's reflectance of more than about 10% when assumed that a white color's reflectance of black is 0% and a white color's intensity of full white is 100%.

10. The stereoscopic display device of claim 8, wherein the sidewalls comprise a light reflective material.

11. The stereoscopic display device of claim 10, wherein the light reflective material is at least one of aluminum (Al) and silver (Ag).

12. The stereoscopic display device of claim 1, wherein the sidewalls further comprise a reflection sheet including a light reflective material.

13. The stereoscopic display device of claim 1, wherein at least one of the first and second display panels is a liquid crystal display panel.

14. The stereoscopic display device of claim 13, wherein the liquid crystal display panel further comprises a backlight assembly supplying light.

15. The stereoscopic display device of claim 14, further comprising:
   a bottom chassis receiving the second mold frame and the backlight assembly; and
   a top chassis fixing the first and second display panels and surrounding the first and second mold frames.

* * * * *